United States Patent [19]
Zand

[11] 4,045,884
[45] Sept. 6, 1977

[54] TEACHING DEVICE FOR THE CORRECTION OF READING, SPELLING AND WRITING LEARNING DISABILITIES

[76] Inventor: Frances Lee Zand, 1247 Hillside, Northbrook, Ill. 60062

[21] Appl. No.: 668,293

[22] Filed: Mar. 18, 1976

[51] Int. Cl.² .......................................... G09B 17/00
[52] U.S. Cl. ............................................... 35/35 R
[58] Field of Search .................. 35/35 R, 35 H, 35 J, 35/48 A

[56] References Cited

U.S. PATENT DOCUMENTS

| | | | |
|---|---|---|---|
| 2,361,154 | 10/1944 | Schoolfield | 35/35 H |
| 2,669,789 | 2/1954 | Buell | 35/35 H |
| 2,682,118 | 6/1954 | Larsen | 35/35 H |
| 2,722,061 | 11/1955 | Webster | 35/35 H |
| 2,723,465 | 11/1955 | Silverstein | 35/35 H |
| 2,725,644 | 12/1955 | Wade et al. | 35/48 A |
| 2,835,989 | 5/1958 | Arrowsmith | 35/48 A |
| 3,570,145 | 3/1971 | Hickey | 35/35 R |
| 3,571,951 | 3/1971 | Siegel et al. | 35/35 R |
| 3,813,471 | 5/1974 | Dean | 35/35 H |
| 3,906,644 | 9/1975 | Levinson et al. | 35/35 R |

*Primary Examiner* — William H. Grieb

[57] ABSTRACT

Serious learning disabilities that are encountered by students learning to read, write and spell include the mirror image reversal of letters, the writing of letters upside down and letter reversals in words. Corrections of these disabilities is achieved by providing a correct or standard version of the letter or word symbol, a matching element with the correct version of the letter or word symbol and indicia thereon which indicate proper orientation of the matching element for testing the match of the standard symbol with a series of test symbols aligned along a row, a majority of which are identical to the matching symbol on the matching element. The standard symbol and the test symbols that are used may be printed on a sheet or card and the matching symbol may be printed on a transparent overlay.

8 Claims, 5 Drawing Figures

TEACHING DEVICE FOR THE CORRECTION OF READING, SPELLING AND WRITING LEARNING DISABILITIES

BACKGROUND OF THE INVENTION

This invention generally relates to the field of learning disabilities, and more particularly to the field of reading, spelling and writing learning disabilities. It has long been recognized that one of the most serious learning deficits acquired by certain students in learning to read, write and spell are those pertaining to figure ground perception, letter form discrimination, reversals, form constancy in space and left to right directionality. Numerous pupils are initially confused as to proper spatial orientation of many letters of the alphabet, the sequences of letters found in specific types of words (for example, was and saw) and the correct form of a certain letter. New improved teaching techniques designed to shorten the learning period and to insure better success in teaching students who have the above-noted problems are constantly sought by educators.

The terms that were referred to in the preceding paragraph refer to various terms that are related to the present invention. For example, "figure ground perception" refers to the distinguishment of letters from the background; "letter form discrimination" refers to the distinguishment of one letter from another; "reversals" refer to the recognition of one word from another which uses the same letters but reversed position; "form constancy in space" refers to the fact that letters should probably be aligned in the same manner in space with respect to each other whenever they make up a word; and "directionally in space" refers to the preferred reading direction for a given language, such as from left to right for English and many other languages.

A prior teaching device that was directed to teaching problems of the general type noted above is shown in U.S. Pat. No. 2,723,465 which issued Nov. 15, 1955, to Esther Silverstein. This device consisted of a series of characters that were either of the cut-out type so that they could be placed into conforming or matching grooves in a board or were printed on a transparent overlay which was matched with an underlying printed character. The version of this device, which utilized matching cut-out characters and grooves in a master board, is relatively expensive to produce: and in addition, is overly complex and, therefore, can be quite confusing to students who are already experiencing confusion.

This confusion can arise from the fact that the grooves that are supplied in the board of the Silverstein device, allow for both the incorrect and correct orientation of the cut-out character. Moreover, with the Silverstein device, the student will not learn to deal with the correct orientation of each and every letter of the alphabet per se, but instead he is learning to match the letters of a given word in a letter-by-letter fashion. This approach, of course, increases the difficulty of learning to read, write and spell for the student, and it is generally not satifactory, expecially for younger children, since it is highly desirable to initially isolate the problem of letter form discrimination from the problem of character association in the building of words, and to handle the problem of letter reversals in words thereafter as a separate problem.

The transparent overlay of the Silverstein device is noteworthy, however, despite the fact that the Silverstein patent notes that this version is not the preferred embodiment of the patent. The Silverstein device contemplates a matching of a letter printed on the transparent overlay and a printed correct or incorrect versions of the character appearing on an underlying board. With the Silverstein device, however, the matching element itself was subject to misorientation because it could be placed on the pegs 30 upside down. In addition, the matching of characters as described in the patent was accomplished in a manner which did not serve to teach the reader to read the normal from left to right scan for reading English and other languages. Furthermore, the principle of learning reinforcement, which is recognized today as being a great importance in most learning activities, was not employed when the Silverstein device was used.

The present invention is designed to correct the previously mentioned learning reading, writing and spelling disabilities in less time than previous methods and with a greater measure of successes.

DESCRIPTION OF THE DRAWINGS

The present invention is illustrated by reference to the drawings in which.

TECHNICAL DESCRIPTION OF THE INVENTION

Figure 1:
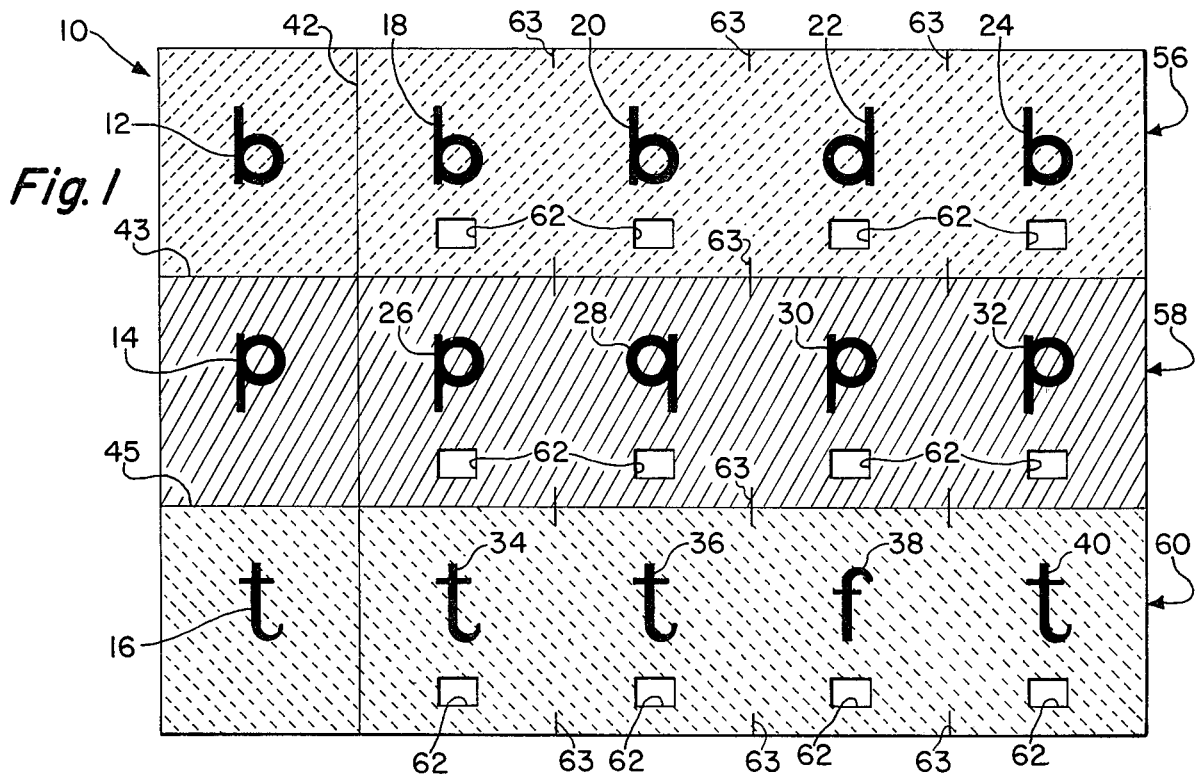
FIG. 1 is a plan view of a sheet or card which has printed thereon a series of standard letters, each of which are succeeded in a left-to-right direction along a row by a series of test letters.

The presently preferred embodiment of the present invention is shown in the drawings in which a master sheet or card 10 has a number of standard letters 12, 14 and 16 of the alphabet printed on it with the correct orientation and a number of test letters 18 through 40 printed to the right of each of the standard letters 12, 14 and 16, as viewed in FIG. 1. In each row of test letters the majority of the letters are properly oriented and they are identical to the standard letter of the same row, such as the standard letter 12, which is *b* positioned to the left of the dividing line 42 in the top row 56. In the top row 56 of letters, the test letters 18, 20 and 24 are identical to the standard letter 12 and only the letter 22 is different. In the illustrated example of FIG. 1, the letter 22 represents a *d* although it could alternatively represent a *p* or a *q* or any other symbol or letter which a student may find to be confusing with respect to the correct letter or symbol, such as the standard letter 12.

It is preferred that the majority of test symbols in each row be identical to the standard symbol that is positioned to the left of the dividing line 42. It has been found that this is highly desirable since the principle of learning reinforcement is thereby utilized, allowing the student to learn faster and to acquire a greater degree of confidence. This feature thus forms a highly desirable advantage of the described technique and method of the present invention.

Other important advantages are achieved with the present invention by providing a number of matching elements 44, each of which have printed thereon a matching letter 46 corresponding to one of the standard letters of the board or sheet 10. For example, the matching element 44 of FIG. 2 displays a matching letter 46, which is the character *b*. The letter 46 is preferably printed on a transparent overlay 48, which may be made of plastic and which may be secured to a rigid or semi-rigid frame 50. An orientation indicia may be applied somewhere on the matching element 44, for example, the dot 52 on the lower arm 54 of the frame 50 can be used to insure that proper orientation or form constancy of the letter 46 is achieved. The matching letter 46 could, of course, be replaced with a cut-out letter, if desired.

The rows 56, 58 and 60 of test letters are defined by the lines 43, 45 and they are all preferably printed on different color backgrounds, as indicated by the different shadings for the rows 56, 58 and 60 in FIG. 1. The matching element 44 that is to be used to "test" the characters of the row may also be provided with a frame 50 of the same color as the background for the corresponding row, such as the row 56 shown in FIG. 1. This may be of considerable help to the student since it initially directs him to the proper row without external stimuli, thereby also tending to increase the student's confidence in an indirect manner. The matching letters 46 could alternately all be of a different color than the letters printed on the sheet or card 10 to bring out the contrast when matching is attempted; or, if desired, they could be of the same color as the frame 50. The short guide marks 63 help the student align the edges of the frame 50 so the letter 46 is in position over the letters 18 through 24 when the match of the letters is tested.

The test letters 18 through 40 all preferably have a small rectangular box 62 or other closed figure printed adjacent and below them. A transparent cover or envelope 64 may then be positioned to receive the sheet or card 10 therein. The cover 64 may be provided with holes 66 for a loose-leaf notebook, if desired. With the sheet or card 10 positioned in the cover 64 a measure of protection against liquids, greases, etc. is provided for the sheet or card 10. In addition, the student can use a grease pencil or other eraseable marker to mark on the cover 64 over each of the boxes 62 for the test letter in a given row which he initially believes will match the standard letter for that row before he proceeds to match each of the test letters for that row with the corresponding matching letters. This feature allows the student to eventually discard the matching element 44 so that he can test himself against the master board or sheet 10 only. In addition, it provides an incentive to the student even when the matching element is to be used since it requires that the student attempt to determine the correct and incorrect matches of the test letters and the associated standard letter on his own without reliance on the matching element, which is the goal that eventually is to be reached, of course.

The manner in which the reading, spelling and writing teaching technique of the present invention is utilized may be better understood by reference to the drawings.

Figure 2:
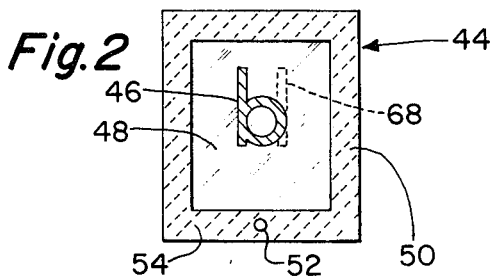
FIG. 2 is a plan view of one matching letter printed on a transparent overly which corresponds to one of the printed standard letters of FIG. 1.

With respect to learning the alphabet and using the invention of FIGS. 1 and 2, the first step is to have the student refer to a depicted standard letter, such as the letter 12, which is a *b*.

2. Next, the student may be asked to estimate which of the test letters, such as the letters 18, 20, 22 and 24 are identical to the standard letter 12 and which are different, and to provide a record of this choice, such as by marking an "X" in the boxes 62 below the test letters which match the standard letter 12.

3. The preceding step may be eliminated during the initial use of the device by the student, if desired; and the student may proceed directly to the next step which is the selection and proper orientation of the correct matching element that corresponds to the selected row. This selection is aided by color correspondence between the color of the background of the row and either the color of the frame or the orientation dot on the frame, or of other convenient indicia associated with the correct matching element 44. During this step the matching element 44 can be overlaid on the standard letter 12 to verify the match between the standard letter 12 and the letter 46 on the transparent overlay 48, if desired. The orientation dot 52 may also be employed during this step to achieve proper orientation of the matching letter 46 with respect to the sheet or card 10.

4. After the student is satisfied that his matching letter 46 does correspond to the standard letter 12, he may proceed in a left-to-right or normal reading direction to test the match of each of the test letters 18, 20, 22 and 24 with the matching letter 46. If the boxes 62 were prechecked by the student, he may be graded based on the percentage of correct answers he marked, thereby providing a quantative verification of the efficiency of the technique for the particular student involved. When a match is achieved, such as occurs when the letter 46 is laid over the letters 18, 20, and 24, no portion of the underlying test letter will be viewed through the transparent overlay 48. However, when the letter 46 is laid over the test letter 22, a portion 68 of the letter 22 will be viewed through the transparent overlay 48 which indicates that the letter 46 and 22 are different and that a match has not been obtained.

Figure 3:
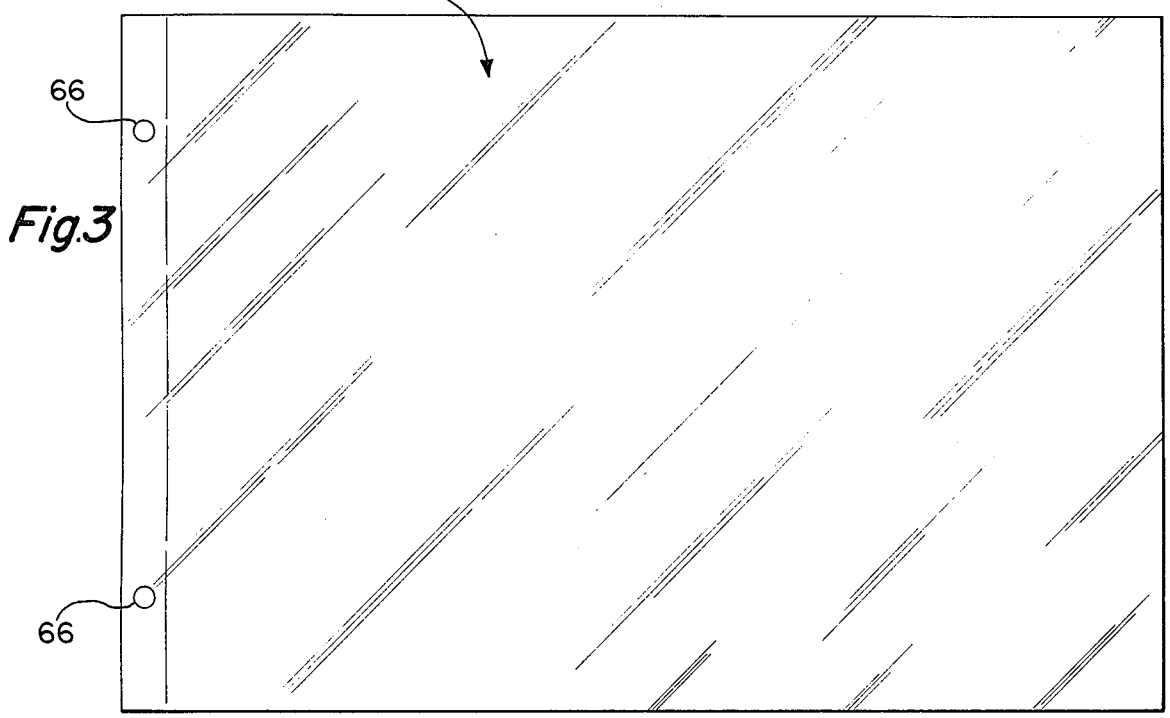
FIG. 3 is a plan view of a transparent cover or envelope which receives the printed sheet or card of FIG. 1 therein.
Figure 4:
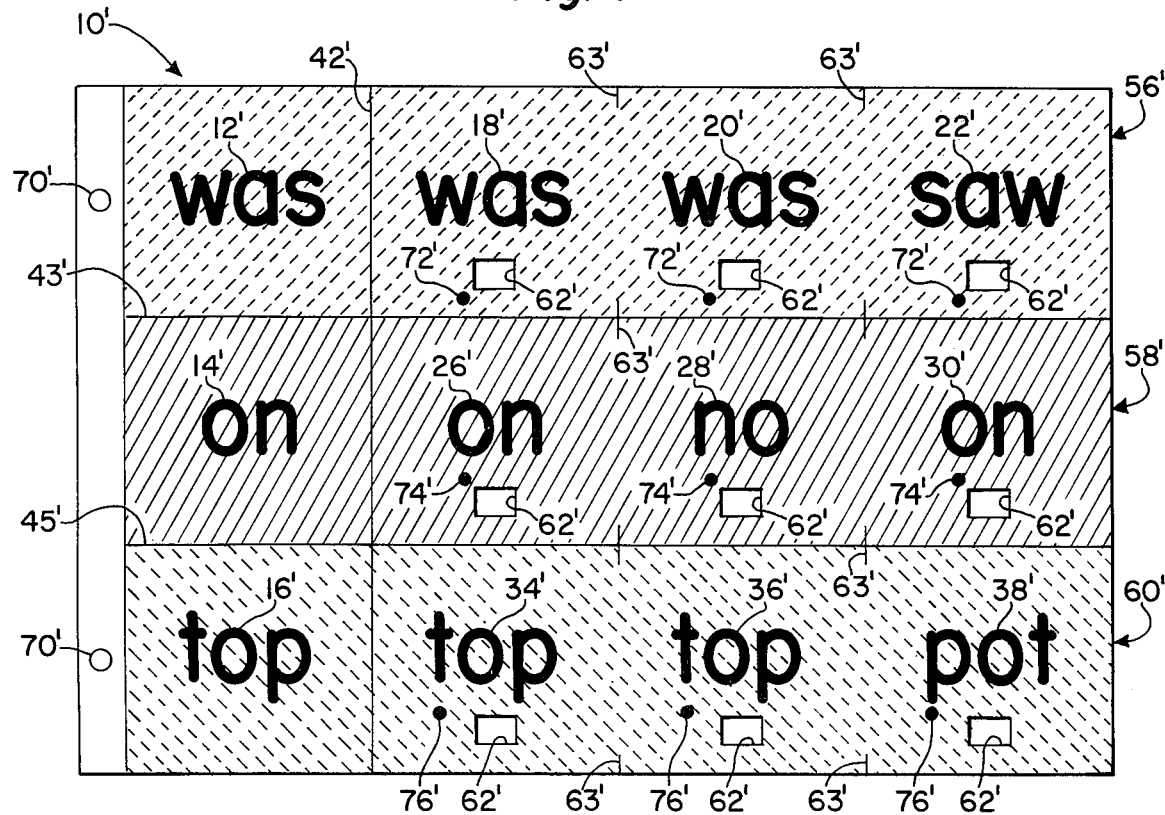
FIG. 4 is a plan view of a sheet or card which has printed thereon a series of standard words, each of which are succeeded in a left-to-right direction along a row by a series of test words.

Another sheet or card 10' which may be inserted into the cover 64 of FIG. 3 is shown in FIG. 4. The only difference between the card 10 and card 10' being that letters are printed on the card 10 while words are printed on the card 10'. Since the cards or sheets of FIGS. 1 and 4 are substantially similar, the element numbers of FIG. 4 are the same as those of FIG. 1 for similar elements except that the element numbers of FIG. 4 are printed while those of FIG. 1 are not. The card 10' may be used to correct the problems of letter reversal in words which sometimes causes students to confuse words such as "saw" and "was,+ "on" and "no" or "top" and "pot." The teaching device of FIGS. 4 and 5 is a logical extension of the teaching device of FIGS. 1 and 2 and any problems that the student may have which are correctable by the device of FIGS. 1 and 2 are preferably corrected before use of the device of FIGS. 3 and 4 is undertaken.

The sheet or card 10' of FIG. 4 is identical to the sheet or card 10 of FIG. 1 with the exception that standard words 12', 14', 16', instead of letters, are printed on the sheet or card 10' to the left of the line 42' and test words 18' through 40' instead of letters, are printed to the right of the line 42'. The matching element 44' of FIG. 5 is identical to the matching element 44 of FIG. 2 except that a matching word 46', instead of a matching letter, is printed on the transparent overlay 48'.

Figure 5:
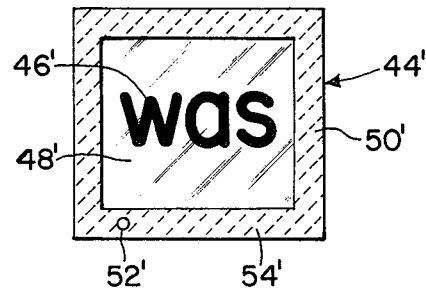
FIG. 5 is a plan view of one matching word printed on a transparent overlay which corresponds to one of the printed standard words of FIG. 4.

Learning reinforcement and left-to-right direction are emphasized in the embodiment of FIGS. 4 and 5 just as they are in the embodiments of FIGS. 1 and 2. The sheet or card 10' also may contain the marking boxes 62' and it may be slipped into a cover or envelope, such as the plastic cover 64 of FIG. 3. The lefthand side of the sheet or card 10' may have 70' punched into it which are in alignment with the holes 66 in the cover 64 so the sheet or card 10' and the cover 64 may be placed into a loose-leaf notebook.

The color matching scheme of the embodiment described with reference to FIGS. 1 and 2 may also be used in the embodiment of FIGS. 4 and 5. In addition, an orientation indicia such as the dot 52' on the matching element 44' may be used. The dot 52' may be centered as it is on the frame 50 of FIG. 2, or it may be positioned under the first letter of the matching word 46', as shown in FIG. 5. If desired, dots may also be printed at various locations in the rows 56', 58' and 60' where the dots 72', 74' and 76' are placed on the lower lefthand corner of the box 62', the upper lefthand corner of the box 62' and under the first letter of the test words 34' through 38', respectively. The dots 72' are preferably positioned so that they line up with the dots 52' on the frame 50' of the matching element 44' when it is aligned with the guide marks 63'.

The use of the embodiment of FIGS. 4 and 5 to aid a student who has difficulty in distinguishing words where letter reversal confusion, such as "saw" and "was" or "on" and "no" and "top" and "pot" is the same as the use of the embodiment of FIGS. 1 and 2 for remediating the difficulties some students have in recognizing letters correctly, and the previous description of the learning steps that may be followed when using the embodiment of FIGS. 1 and 2, therefore, also applies to the embodiment of FIGS. 4 and 5.

While a particular embodiment of the present invention has been described, the invention may be adapted by those skilled in the art to other embodiments and for languages, with the term "symbol", as used in the claims, being understood to be employed in its broadest sense to apply to letters, words and other symbols that may be taught by use of the present invention, without departing from the spirit and scope of the present invention, which is to be measured by the appended claims.

What is claimed is:

1. A teaching device comprising first means with at least one standard symbol, which is representative of a letter, depicted thereon and at least three test symbols depicted on said first means for each of said standard symbols, each of said test symbols being aligned in a set with an associated standard symbol in a normal reading direction, a majority of said test symbols being identical to, and having the same orientation as, their associated standard symbols, and at least one second means with a matching symbol depicted thereon which is identical to said standard symbol and which is constructed so that said matching symbol may be overlaid selectively on said associated standard symbol or on said test symbols which are aligned with their associated standard symbol to provide a visual test of whether or not said test symbols correspond to their associated standard symbol with which they are aligned, wherein said teaching device is useful for the correction of learning disabilities involving mirror image reversals, recognition and orientation learning disabilities relating to letters, said standard symbols each comprise a standard letter, said test symbols each comprise a test letter and at least one, but not more than a minority, of said test letters are a letter that is mirror image reversal of its associated standard letter, or a letter that is identical to the associated standard letter but is improperly oriented with respect thereto or a properly oriented letter that is similar in some respects, but is not identical, to the associated standard letter and the matching symbols each comprise a matching letter that corresponds to one of said standard letters.

2. A teaching device claimed in claim 1 wherein said matching symbols have orienting indicia associated therewith for achieving proper orientation of said matching symbol.

3. A teaching device claimed in claim 1 wherein each of said test symbols are provided with grading indicia that allows the user thereof to provide a recorded estimation of a matching condition for each of said test symbols with the associated standard symbol prior to the testing of the match of said test symbols with said standard symbol.

4. A teaching device as claimed in claim 1 wherein only one of said test symbols of each of test symbols is different from the associated standard symbols.

5. A teaching device comprising first means with at least one standard symbol which is representative of a word depicted thereon and at least three test symbols depicted on said first means for each of said standard symbols, each of said test symbols being aligned in a set with an associated standard symbol in a normal reading direction, a majority of said test symbols being identical to and having the same orientation as their associated standard symbol and at least one second means with at least one matching symbol depicted thereon which is identical to said standard symbol and which is constructed so that said matching symbol may be overlaid selectively on said associated standard symbol or on said test symbols which are aligned with their associated standard symbol to provide a visual test of whether or not said test symbols correspond to their associated standard symbol with which they are aligned, wherein said teaching device is useful for the correction of learning disabilities relating to letter reversals in words, said standard symbols each comprise a standard word, said test symbols each comprise a test word and at least one, but not more than a minority, of said test words is a word which has a letter reversal with respect to its associated standard word and the matching symbols each comprise a matching word that corresponds to one of said standard words.

6. A teaching device claimed in claim 5 wherein said matching symbols have orienting indicia associated therewith for achieving proper orientation of said matching symbol.

7. A teaching device claimed in claim 5 wherein each of said test symbols are provided with grading indicia that allows the user thereof to provide a recorded estimation of a matching condition for each of said test symbols with the associated standard symbol prior to the testing of the match of said test symbols with said standard symbol.

8. A teaching device as claimed in claim 5 wherein only one of said test symbols of each set of test symbols is different from the associated standard symbol.

* * * * *